Aug. 19, 1941. M. FRISCH Re. 21,878

METHOD AND APPARATUS FOR COMBUSTION

Original Filed Jan. 21, 1935 5 Sheets-Sheet 1

INVENTOR.
MARTIN FRISCH
BY
William G. McKnight,
ATTORNEY.

METHOD AND APPARATUS FOR COMBUSTION

Original Filed Jan. 21, 1935 5 Sheets-Sheet 2

INVENTOR.
MARTIN FRISCH
BY
William G. McKnight
ATTORNEY.

METHOD AND APPARATUS FOR COMBUSTION

Original Filed Jan. 21, 1935 5 Sheets-Sheet 3

INVENTOR.
MARTIN FRISCH
BY
William E. Mc Knight
ATTORNEY.

METHOD AND APPARATUS FOR COMBUSTION

Original Filed Jan. 21, 1935 5 Sheets-Sheet 4

INVENTOR.
MARTIN FRISCH
BY
William G. McCluney Jr.
ATTORNEY.

METHOD AND APPARATUS FOR COMBUSTION
Original Filed Jan. 21, 1935 5 Sheets-Sheet 5
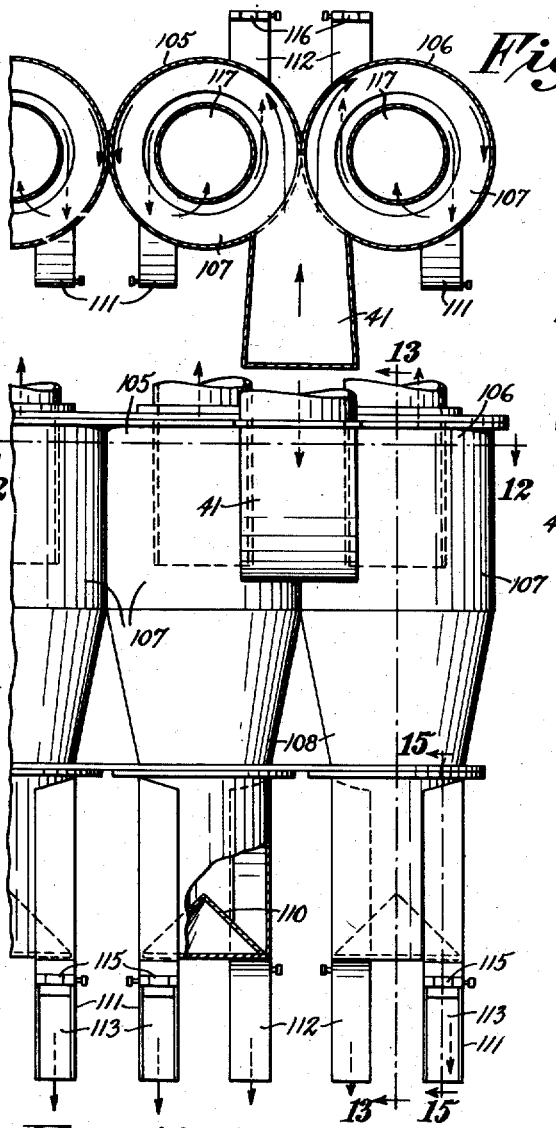
Fig. 12.
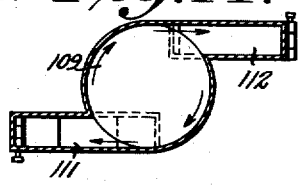
Fig. 14.
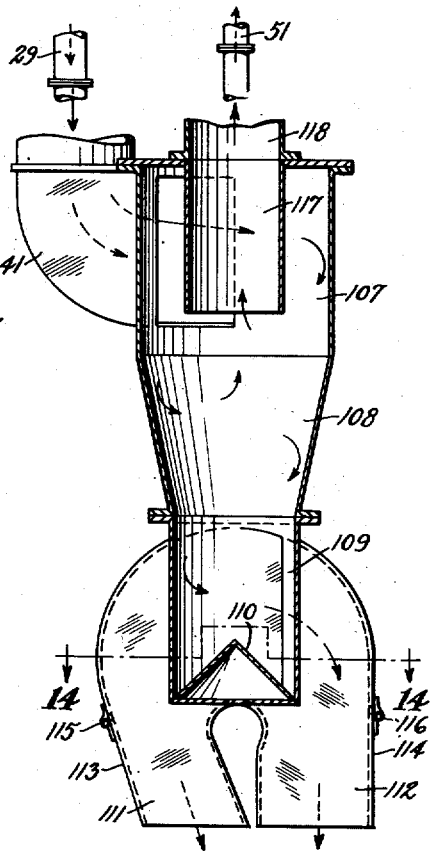
Fig. 11.
Fig. 13.
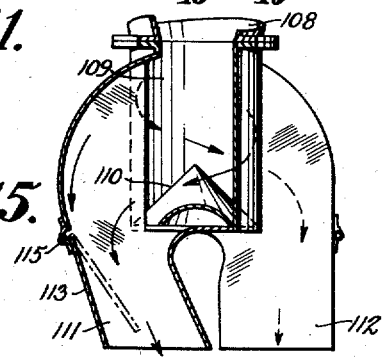
Fig. 15.
INVENTOR.
MARTIN FRISCH
BY William E. McKnight Jr.
ATTORNEY.

Reissued Aug. 19, 1941

Re. 21,878

UNITED STATES PATENT OFFICE 21,878

METHOD AND APPARATUS FOR COMBUSTION

Martin Frisch, New York, N. Y., assignor to Foster Wheeler Corporation, New York, N. Y., a corporation of New York Original No. 2,118,600, dated May 24, 1938, Serial No. 2,622, January 21, 1935. Application for reissue February 10, 1940, Serial No. 318,378

19 Claims. (Cl. 110—106)

This invention relates to the combustion of fuels and provides novel methods and apparatus for producing the combustion of fuels entrained in currents or streams of air.

The invention is capable of effective application to the burning of a wide variety of fuels but is particularly useful for the combustion of pulverized fuels of low volatility. With low volatile fuels, such as certain anthracite and bituminous coals, it is desirable that the ratio of fuel to the carrying air which is delivered to the furnace by the burners be high so that ignition may be easily produced and maintained and it is also desirable that the velocity of the air fuel mixture delivered by the burners be low for the reason that the velocity of flame propagation of such mixtures is ordinarily very low.

The methods and apparatus of the present invention readily and efficiently effect the control of the richness of a fuel and air mixture which is delivered to fuel burners from the source of supply to provide the degree of richness of the mixture which is delivered by the burners to the furnace for efficient combustion. The invention also provides an effective control of the velocity at which the combustible mixture of desired richness is delivered by the burners to the furnace. Other features and advantages of the invention will be perceived from the following description considered in connection with the accompanying drawings, forming a part thereof, in which the embodiments of the invention which have been selected for disclosure are illustrated.

In the drawings:

Fig. 11 is a vertical elevational view, with parts in section, of another form of apparatus embodying the invention;

Fig. 12 is a transverse sectional view taken on line 12—12 of Fig. 11;

Fig. 13 is a longitudinal sectional view taken on line 13—13 of Fig. 11;

Fig. 14 is a sectional view taken on line 14—14 of Fig. 13; and

Fig. 15 is a sectional view taken on line 15—15 of Fig. 11.

Like characters of reference designate the same or similar parts in the several views of the drawings.

Figure 1:
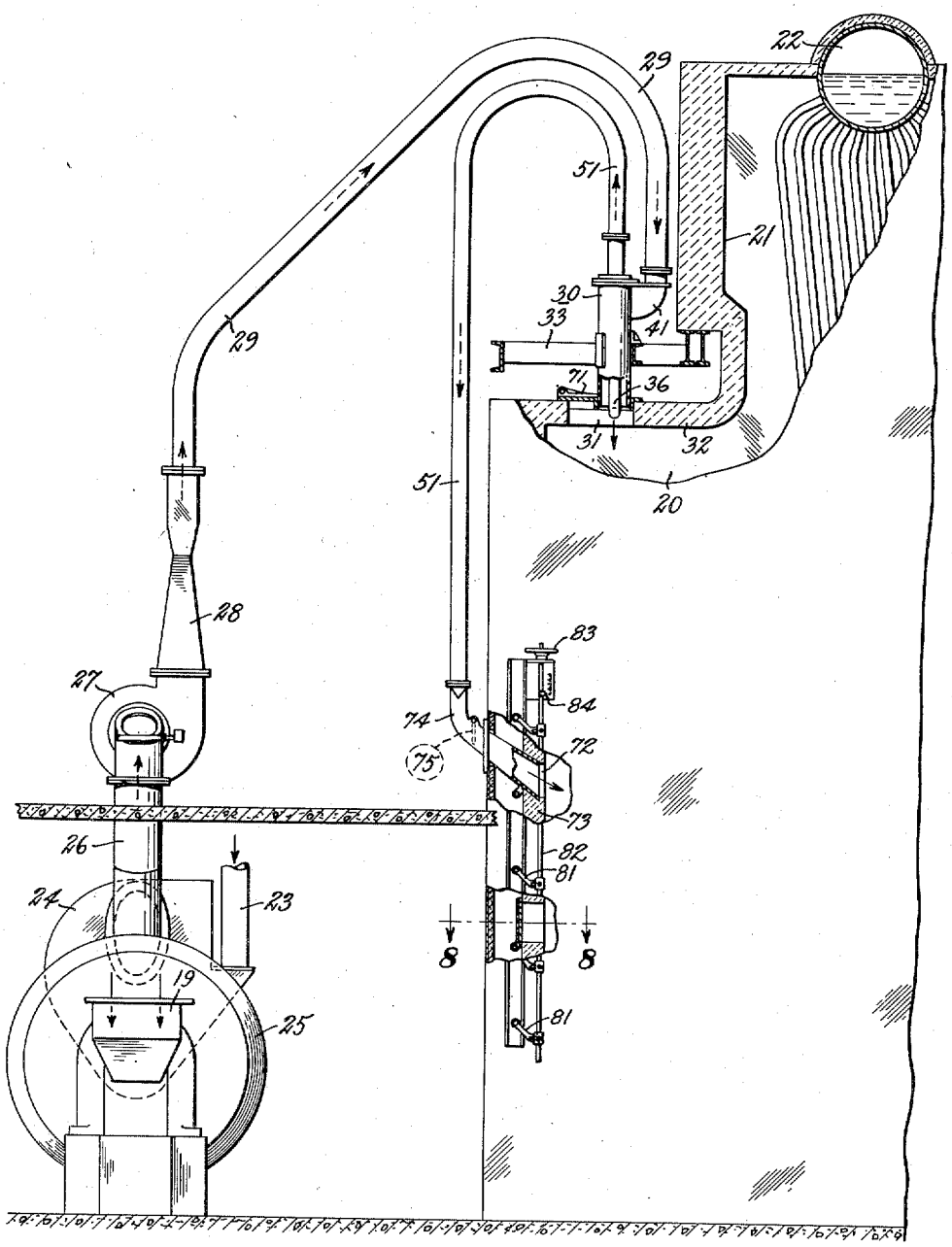
Fig. 1 is a view in elevation with parts in section, of apparatus for producing combustion which embodies the present invention.
Figure 2:
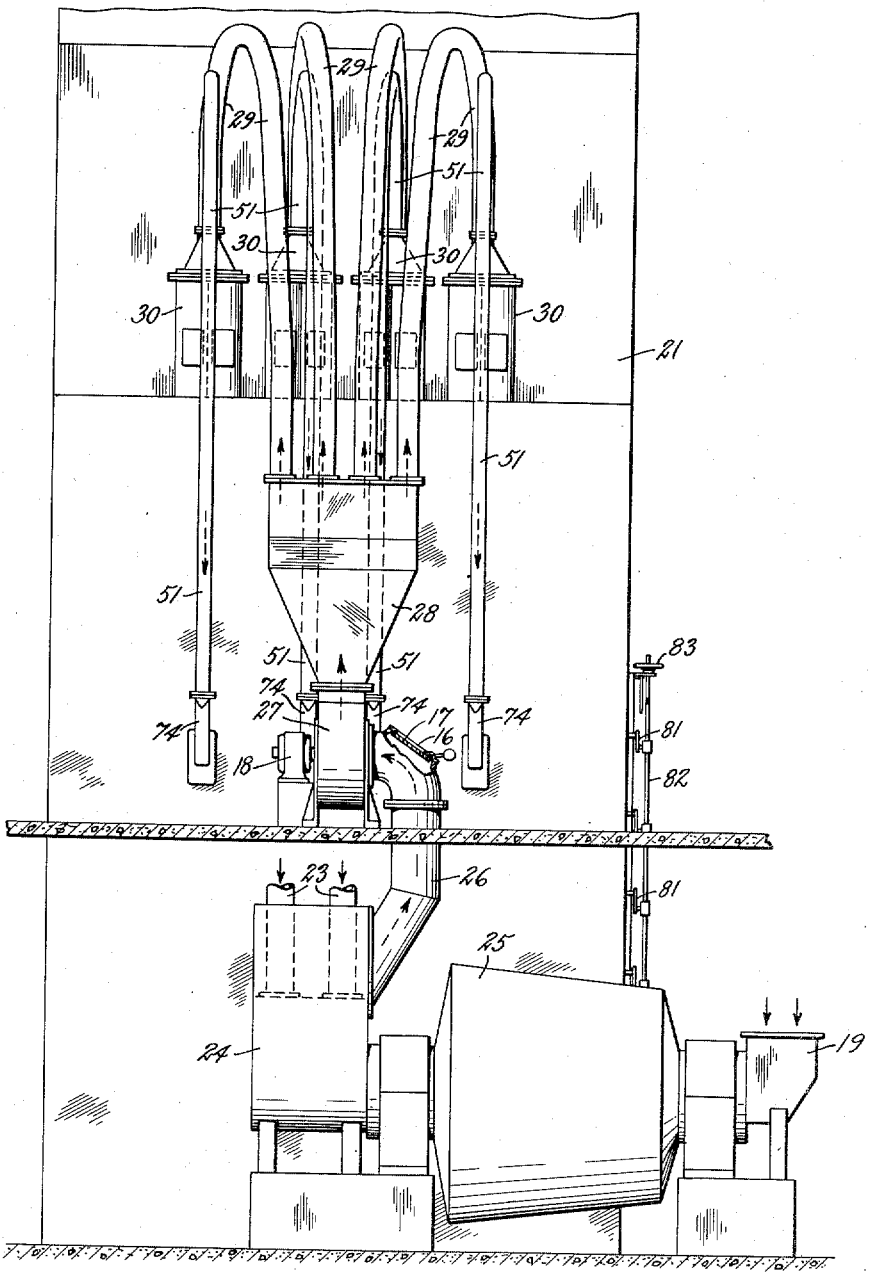
Fig. 2 is a front elevational view of the apparatus shown in Fig. 1.
Figure 4:
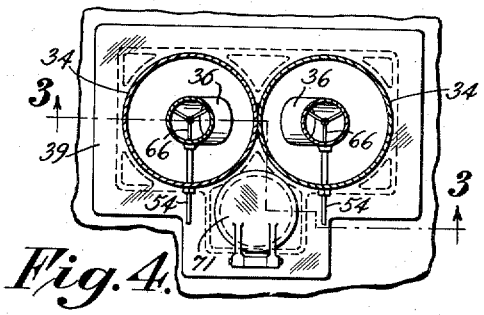
Fig. 4 is a transverse sectional view taken on line 4—4 of Fig. 3.
Figure 5:
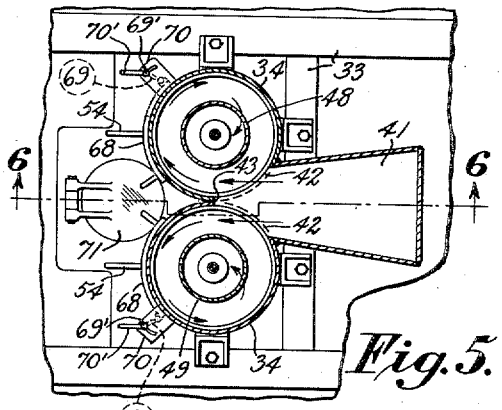
Fig. 5 is a sectional view taken on line 5—5 of Fig. 6.
Figure 3:
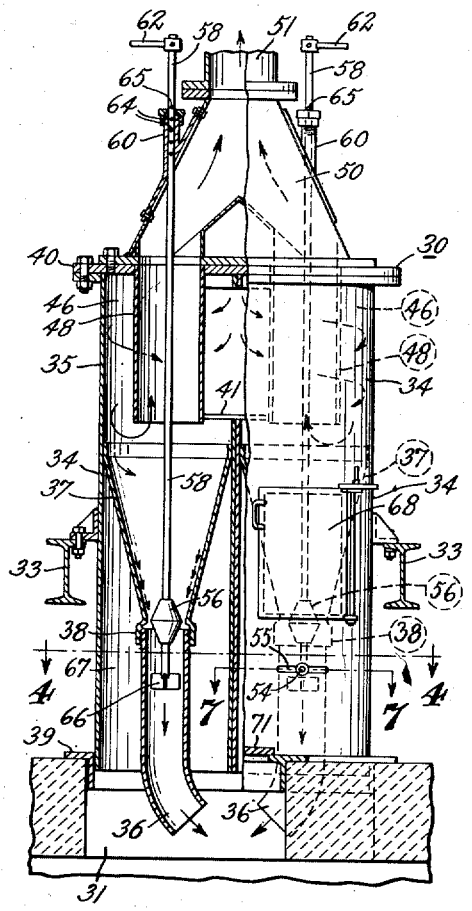
Fig. 3 is a sectional elevational view on an enlarged scale of the burner shown in Fig. 1.
Figure 6:
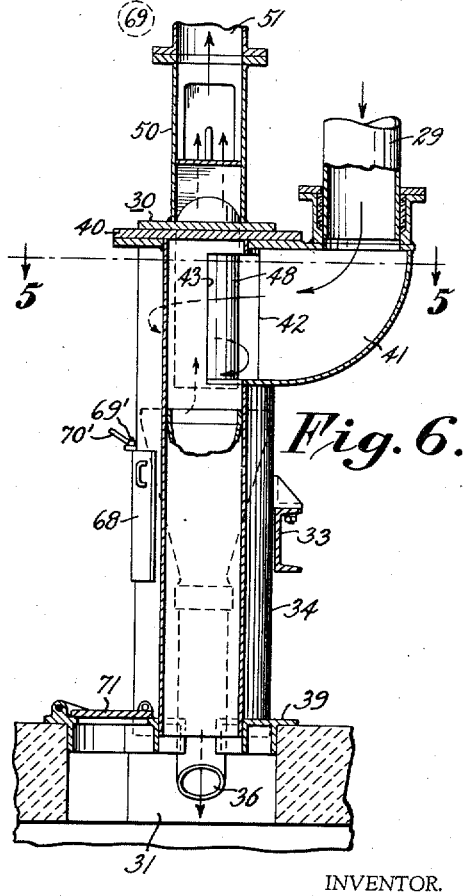
Fig. 6 is a sectional view taken on line 6—6 of Fig. 5.
Figure 7:
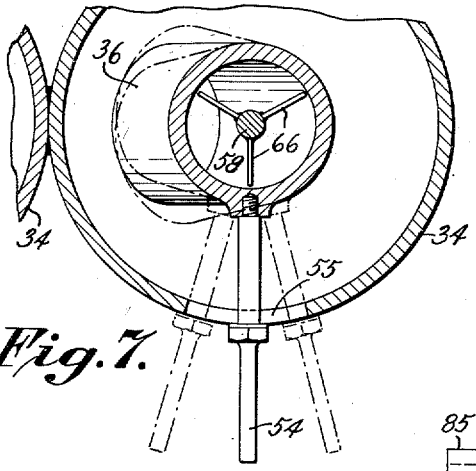
Fig. 7 is a sectional view taken on line 7—7 of Fig. 3.

The forms of the invention disclosed are arranged for producing combustion in the furnace of steam generating apparatus but it will be understood that the invention is not limited to this particular application but may be employed for producing combustion in any other furnace.

Referring particularly to Figs. 1 to 8 inclusive, reference character 20 designates the furnace of a steam generator having a setting 21 and a steam and water drum 22. The steam generator may be of any desired form. The system disclosed in these figures of the drawings effects the reduction of the fuel to finely divided form, the entraining of the reduced fuel in a current of air and the delivery of the fuel and air mixture directly to the furnace by means of burners embodying the invention. The fuel, anthracite or bituminous coal in this instance, is delivered to the feed pipes 23 and is conducted through the fuel feed portion of a classifier 24 into the pulverizing mill 25 of any suitable type. The mill comprises a rotatable drum having pulverizing means such as a plurality of steel balls of varying diameters. Air, preferably preheated, is introduced into the mill through the air inlet 19 and sweeps entirely through the mill over the surface of the fuel being pulverized therein and picks up the reduced fuel and carries it through the classifier 24 wherein the fuel particles which have not been sufficiently pulverized are separated from the fuel and air stream and are returned to the mill 25. The air stream and entrained pulverized fuel then flows through discharge pipe 26 into an exhauster 27 which is driven by suitable means such as the electric motor 18. A damper 17 is hingedly mounted in pipe 26 and is movable between a position in which pipe 26 is fully open and an opening 16 is completely closed and a position in which pipe 26 is completely closed and opening 16 is fully open. The damper 17 may be retained in any position intermediate these two positions to close or open to varying degrees the opening 16 in pipe 26 and at the same time to operate as a control valve for pipe 26. Damper 17 may be operated manually or automatically. The exhauster 27 delivers the fuel and air mixture into a distributor 28 which distributes the mixture more or less uniformly to the delivery pipes 29 which conduct the fuel and air mixture to burners 30 which embody the invention.

The burners 30 are arranged to discharge vertically downwardly through burner ports 31 in a horizontally disposed wall 32 of the boiler setting 21. Suitable means indicated 33 are provided for supporting the burners 30 in proper position relative to the ports 31. Referring particularly to Figs. 3 to 6 inclusive, each burner 30 comprises a pair of contiguous cylindrical casings 34 having open lower ends with a centrifugal separator 35 disposed in its upper portion, a nozzle 36 in its lower portion and a tubular member 37 which is gradually contracted toward its lower end and which connects the separator and the nozzle. The upper ends of members 37 are welded or otherwise secured to the interior of the casings 34 and the lower ends 38 are threaded for connection to the upper ends of the nozzles 36. The lower ends of the cylindrical casings 34 fit into cylindrical apertures in a member 39 which engages the setting 21 and the walls of ports 31, and the upper ends of the casings are closed and held together by a cover 40. The fuel and air mixture is delivered through pipe 29 in a vertically downward direction into an elbow 41 through which it is delivered in a horizontal direction to the separators 35 through adjacently disposed inlet ports 42 in the walls of casings 34. The stream of fuel and air delivered to the burners is divided by the vertically disposed edges 43 of the casings 34 at the contiguous sides of ports 42, into two approximately equal portions, each of which is caused to flow in a spiral path toward the nozzles 36 in the annular space 46 between the casing 34 and the tubular outlet 48 which extends downwardly from the cover 40 and is coaxially disposed in the upper part of the casing 34. A portion of the stream of fuel and air flowing through each separator 35 is continually withdrawn through the outlet 48 and is delivered through the connection 50 to a delivery pipe 51 which may conduct the separated air and any fuel entrained therein to any point desired. In this instance, the separated air and fuel is delivered to the furnace as part of the secondary air supply as will hereinafter be described. The withdrawal of part of the air from the main air stream flowing through the spaces 46, concentrates the fuel in the remaining air thereby enriching the fuel and air mixture which enters the members 37. The enriched mixture flows downwardly through the members 37 and is delivered to the nozzles 36. As shown, the lower ends of the nozzles 36 are bent or curved so that the fuel is delivered to the furnace in a downwardly, vertically inclined direction. Operating rods 54 which project through and move in slots 55 in the casings 34, provide means for rotating the nozzles 36 about their axes with respect to members 37 so that the fuel and air jets delivered by the nozzles may be directed as desired to impinge upon each other or not as desired. Means are provided for throttling the upper ends of the nozzles 36 in order to provide for the control of the degree to which the fuel and air mixture delivered to the separators is enriched and also to control the velocity at which the enriched fuel and air mixture is delivered by the nozzles to the furnace. In this instance, such means consists of vertically reciprocable valves 56 which may be described as consisting of two frusto-conical sections with a common base. These valves are mounted adjacent the lower ends of valve rods 58 which extend upwardly through the members 37 and separator outlets 48 and are supported in tubular supports 60 on member 50. The upper end of each of the valve rods 58 is provided with an operating handle 62 and that portion of each valve rod which lies in the zone of and adjacent to the support 60 is provided with a series of small apertures 64 through which a pin 65 may be inserted to retain the valve and the rod in the desired adjusted position. The lower end of each valve rod 58 is provided with a suitable guiding member 66 which engages the inner cylindrical surface of the upper end of nozzle 36 to maintain the coaxial relationship between the nozzle and the valve. As shown, the maximum diameter of the valves 56 is smaller than the inside diameter of the upper ends of the nozzles 36 so that the nozzles are never completely closed by these valves. The cylindrical casings 34 are each provided with openings in their central portions in the zones of the members 37, through which secondary air may be introduced into the furnace at the burner nozzles through the space 67 between the casing 34 and the members 37 and nozzles 36. These openings are closed by hinged doors 68 provided with means for clamping them in adjusted position which comprises a lever 69 fixed at one end to the door and having a threaded member 70 secured to its other end which moves in an arcuate slot in a plate 70 secured to casing 34. A nut 70′ on the end of an operating handle provides the clamping action required. Each burner is provided with an ignition opening in member 39 adjacent the nozzles 36, which is closed by a hinged cover 71.

The lean mixture or the portion of the air and the fuel entrained therein which is separated from the main or orginal mixture in each burner, is delivered by the pipes 51 through ports 72 in the wall 73 of the setting 21. The discharge end 74 of each pipe 51 is provided with a valve 75 which may be a check valve or may be controlled by suitable means depending upon the circumstances of operation. An air casing 76 spaced from the walls of the setting 21, provides a passageway 77 through which air is delivered to the furnace 20 through a plurality of secondary air ports 78. These ports 78 are controlled by valves 79 which are supported on and are operated by valve rods 80. Each of these rods 80 has an arm 81 fixed to its outer end which is pivotally connected to an operating rod 82. Rod 82 is vertically or axially reciprocated by a hand wheel 83 threaded to the upper end of the rod. An indicator 84 on the upper end of rod 82 provides means by which the extent to which the ports 78 are opened may be visually determined.

The operation is as follows: A mixture of primary air and pulverized fuel entrained therein is withdrawn from mill 25 and after passing through the classifier 24 is withdrawn through pipe 26 by the exhauster 27 and is delivered to the distributor 28 which more or less uniformly distributes the mixture to the several pipes 29 through which the mixture is delivered to the separators 35 of the burners 30. In flowing downwardly in a spiral path through the annular spaces 46 of the separators 35, the greater portion of the pulverized fuel is thrown toward the outer peripheral portions of the streams or toward the casings 34 and upon reaching the lower ends of the outlets 48, portions of the moving air streams together with relatively small portions of the finer particles of the entrained fuel are withdrawn through the outlets 48 and flow through the pipes 51 and are discharged through ports 72 into the lower part of the furnace to support the combustion of the fuel. The withdrawal of portions of the air and fuel streams flowing through the separators 35 is due to the suction action on the furnace 20 by a stack or an induced draft fan connected thereto and to the throttling action of valves 56 which control the burner nozzles 36. The enriched mixture of fuel and air flows downwardly through members 37 from the separators 35 into the nozzles 36 and is discharged thereby into the furnace 20 where it is burned. The velocity at which the enriched primary air and fuel mixture is discharged into the furnace is determined by the positions of valves 56, or in other words, is determined by the extent to which the inlet ends of the nozzles 36 are opened or closed by these valves. These valves also control the extent to which the mixture of primary air and fuel is enriched since they control the difference in pressure between the nozzle inlets and the separator outlets 48. Secondary air in the volumes necessary for combustion may be introduced through the secondary air inlet ports in the burners which are controlled by doors 68 and through the ports 78 in the side walls of the furnace.

With this arrangement it will be perceived that fuels of low volatility may be satisfactorily and efficiently burned for the reason that the velocity at which the primary air and fuel mixture is delivered to the furnace by the burners may be readily and accurately controlled and the ratio of fuel to air in the air fuel mixture delivered to the furnace by the burners may also be readily and accurately controlled. Economy in operation is effected by this arrangement since the air and fuel mixture which is separated from the main fuel and air stream, is delivered to the furnace to support combustion. The range of the control effected by this arrangement may be illustrated from the following: The rich mixture or concentrate delivered to the furnace by the burners may contain from 15 to 35% of the original primary air which is delivered to the burner mixed with from 65 to 90% of the fuel delivered to the burner. The lean mixture separated from the main stream of primary air and fuel and which is delivered to some point in the furnace outside of the ignition zone of the enriched mixture or to any other desired point, will contain from 85 to 65% of the air in the original stream which is delivered to the burners and from 10 to 35% of the fuel originally delivered to the burners.

Figure 10:
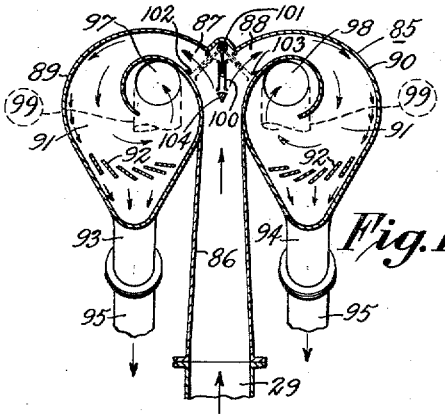
Fig. 10 is a sectional view on an enlarged scale taken on line 10—10 of Fig. 9.
Figure 8:
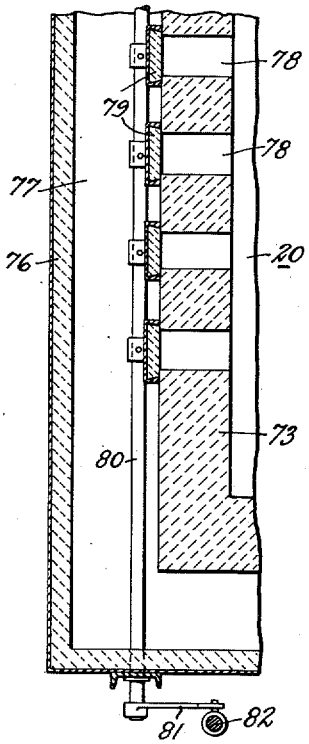
Fig. 8 is a sectional view taken on line 8—8 of Fig. 1.
Figure 9:
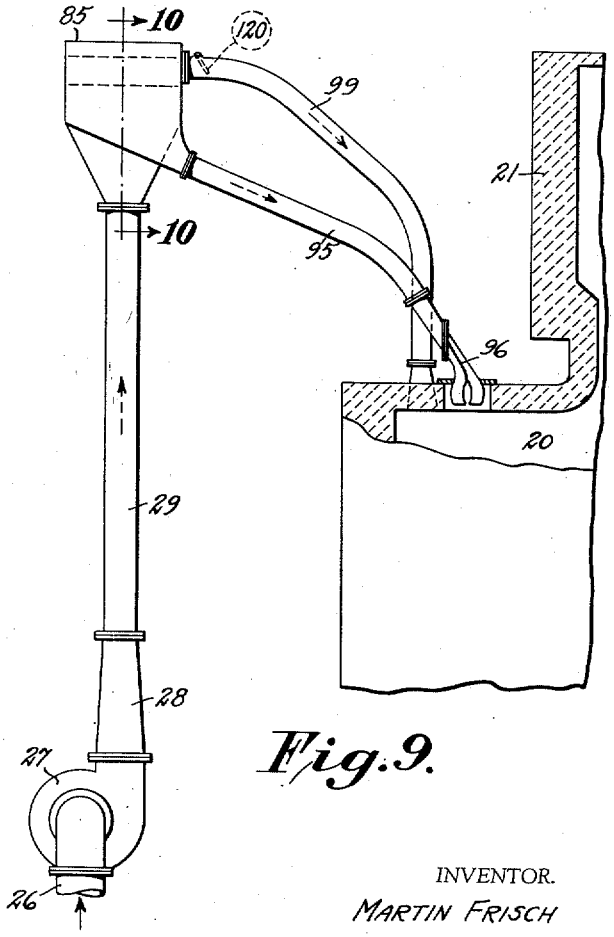
Fig. 9 is a view in elevation with parts in section, of another form of apparatus embodying the invention.

Another arrangement embodying the invention is illustrated in Figs. 9 and 10. In this arrangement, a different form of separator is employed which is disposed at some distance from the burners. The separator indicated 85 has an inlet 86 connected to the discharge end of a pipe 29 which conducts the primary air and fuel mixture from the distributor 28. The inlet 86 of the separator is connected to inlets 87 and 88 of similar but oppositely arranged separator casings 89 and 90, respectively, both of which are arranged to provide spiral paths of flow 91 of the fuel and air mixture therethrough. Centrifugal force acting upon the fuel particles entrained in the air streams causes them to be more or less concentrated in the outer peripheral portions of the streams thereby enriching these portions which pass through a plurality of spaced baffle plates 92 and thence through outlets 93 and 94, respectively, into and through pipes 95 to the burners 96 which may be of any suitable form or design. Portions of the air streams flowing through the spiral flow paths 91 are withdrawn through outlets 97 and 98 respectively, and are delivered through pipes 99 to the furnace 20 adjacent the burners 96 or to any other point in the furnace, or to any point outside of, or remote from, the furnace 20. At the point at which the fuel and air mixture is delivered to the inlets 87 and 88 by pipe 86, switching valve 100 is provided so that the burner 96 connected with either of the pipes 95 may be shut down without disturbing the operation of the other. Valve 100 is double faced and self seating and is movable about a pivot 101 by any suitable operating means into and out of engagement with seats 102 and 103 in inlets 87 and 88 respectively. A shield 104 in inlet 86 protects the valve from the abrasive action of the fuel when both inlets 87 and 88 are fully open, at which time the valve 100 is positioned in vertical alignment with the shield 104. Valves 120 similar to the valve 75, are provided for the pipes 99. Valves 120 may be of the check type or may be controlled by suitable means to control the extent to which the fuel and air mixture which is delivered to the burners, is enriched.

A further arrangement embodying the invention is shown in Figs. 11 to 15 inclusive. In this arrangement the fuel and air mixture is delivered through pipes 29 to elbows 41 through which it is delivered to two adjacently disposed burners 105 and 106. Each of these burners comprises an upper cylindrical portion 107, an intermediate portion 108 of gradually restricted flow area downwardly, a lower cylindrical portion 109 having a distributing cone 110 closing its lower end and nozzles 111 and 112 connected at their upper ends to the portion 109, at diametrically opposed points as may be seen from Fig. 14 particularly. The nozzles have a rectangular flow area in this instance and nozzle 112 is directed vertically downwardly while nozzle 111 is directed in a vertically inclined direction toward the nozzle 112. The arrangement is such that the fuel and air jets discharged from the nozzles do not impinge upon each other. The lower portions of the outer side walls 113 and 114 of the nozzles 111 and 112 respectively, are removable and are hinged at their upper ends 115 and 116 respectively to the nozzles to provide regulating valves for the nozzles to control the velocity at which the enriched fuel and air mixture is discharged into the furnace and also to provide a control for the degree to which the original mixture delivered to the burners is enriched. The upper portion 107 of the burners acts as a separator and the separated portions of the air and entrained fuel are withdrawn through outlets 117 and are delivered through a pipe 118 to the pipes 51. In view of the foregoing description of the operation of the burners disclosed in Figs. 1 to 8, the operation of this form of burner will be apparent.

It will be perceived that the methods and apparatus disclosed will effect the combustion of fuels under the most favorable conditions so that efficient burning is provided for fuels of varying degrees of volatility. The fuel in finely divided or pulverized form is delivered from the source of supply to the burners entrained in air of sufficient quantity to carry the fuel to the burners. Prior to the injection of the fuel into the furnace for combustion, the original fuel and air mixture is enriched to the extent desired for the most efficient burning of the fuel and the velocity at which the enriched mixture is delivered to the furnace is controlled to provide the most efficient burning from the standpoint of flame propagation.

Although a so-called unit system has been disclosed wherein the fuel is delivered to the burners directly from the pulverizing equipment, it will be understood that the fuel may be delivered to the burners from any other source of supply such as a storage bin.

Since changes may be made in the form, location and arrangement of the several parts of the embodiments of the invention herein disclosed without departing from the invention, it will be understood that I do not intend to limit the invention except by the scope of the appended claims.

What is claimed is:

1. Apparatus for producing combustion of fuel in a furnace comprising a separator, means for supplying the fuel entrained in a stream of air to the separator, means for withdrawing part of the air from said mixture to thereby enrich the remaining mixture, a plurality of nozzles through which the enriched mixture is delivered to the furnace for combustion in an ignition section thereof, a valve for controlling the flow area of each nozzle to control the degree to which said mixture is enriched, and means for delivering the air withdrawn from said mixture to the furnace outside said ignition section and at an elevation spaced substantially from the elevation at which the enriched mixture is delivered to the furnace to support combustion of said enriched mixture.

2. Apparatus for producing combustion of fuel in a furnace comprising a separator, means for supplying the fuel entrained in a stream of air to the separator, means for withdrawing part of the air from said mixture to thereby enrich the remaining mixture, a plurality of nozzles through which the enriched mixture is delivered to the furnace for combustion in an ignition section thereof, one of the walls of each of said nozzles being movable to control the degree to which said mixture is enriched, and means for delivering the air withdrawn from said mixture to the furnace outside said ignition section to support combustion of said enriched mixture.

3. Apparatus for producing combustion of fuel in a furnace comprising a separator, means for supplying the fuel entrained in a stream of air to the separator, means for withdrawing part of the air from said mixture to thereby enrich the remaining mixture, a burner nozzle through which the enriched mixture is delivered to the furnace for combustion in an ignition section thereof, one of the walls of said nozzle being movable to control the flow area of said nozzle to control the degree to which said remaining mixture is enriched, and means for delivering the air withdrawn from said mixture to the furnace outside said ignition section to support combustion of said enriched mixture.

4. The method of producing combustion of fuels which comprises entraining the fuel in a stream of air, causing said fuel and air stream to flow in a curved path, withdrawing part of the air from the fuel and air stream as it flows through the curved path to enrich the remaining mixture, delivering the enriched mixture to a furnace through one wall thereof for combustion in an ignition zone, controlling the degree to which said remaining mixture is enriched, and delivering the separated air to the furnace through another wall thereof outside of and below said ignition zone to rejoin the burning enriched mixture.

5. The method of producing combustion of fuels which comprises entraining the fuel in a stream of air, causing said fuel and air stream to flow in a curved path, withdrawing part of the air from the fuel and air stream as it flows through the curved path to enrich the remaining mixture, delivering the enriched mixture in a vertically downward direction through a wall of the furnace for combustion in an ignition zone, controlling the nozzle to thereby control the degree to which said remaining mixture is enriched, and delivering the separated air to the furnace outside of and below said ignition zone and through another wall of the furnace to rejoin the burning enriched mixture.

6. Apparatus for producing combustion of fuel in a furnace comprising a burner, means for supplying fuel suspended in a stream of air to the burner, means for withdrawing part of the air from said stream to thereby enrich the remaining fuel and air mixture, means for delivering the enriched mixture to the furnace for combustion through one wall of the furnace, and means for delivering the air withdrawn from the stream to the furnace outside of and below the ignition section of the furnace through another wall thereof to rejoin the burning enriched mixture.

7. Apparatus for producing combustion of fuel in a furnace comprising a plurality of separators. a single conduit for delivering fuel entrained in a stream of air to each of said separators, means for withdrawing part of the air from the fuel-air mixture in each separator to thereby enrich the remaining mixture, a nozzle for each separator through which the enriched mixture is delivered to the furnace for combustion in an ignition section thereof, and means for delivering the air withdrawn from said mixture in each separator to the furnace outside of and below said ignition section and at an elevation spaced substantially from the elevation at which the enriched mixture is delivered to the furnace to rejoin said burning enriched mixture.

8. Apparatus for producing combustion of fuel in a furnace comprising a plurality of separators, a single conduit for delivering fuel entrained in a stream of air to each of said separators, means for withdrawing part of the air from the fuel-air mixture in each separator to thereby enrich the remaining mixture, a nozzle for each separator through which the enriched mixture is delivered to the furnace for combustion in an ignition section thereof, each nozzle having a discharge end disposed at an angle to the axis of the nozzle, means for moving each nozzle about its axis to vary the direction in which the enriched mixture is discharged from the nozzle, and means for delivering the air withdrawn from said mixture in each separator to the furnace outside said ignition section to rejoin said burning enriched mixture.

9. Apparatus for producing combustion of fuel in a furnace comprising a plurality of separators, means for delivering fuel entrained in a stream of air to each of said separators, means for withdrawing part of the air from the fuel-air mixture in each separator to thereby enrich the remaining mixture, a nozzle for each separator through which the enriched mixture is delivered to the furnace for combustion in an ignition section thereof, each nozzle having a discharge end disposed at an angle to the axis of the nozzle, means for moving each nozzle about its axis to vary the direction in which the enriched mixture is discharged from the nozzle, valve means cooperating with each nozzle to control the degree to which the mixture is enriched in each separator, and means for delivering the air withdrawn from said mixture in each separator to the furnace outside said ignition section to support combustion of said enriched mixture.

10. The method of producing combustion of fuels which comprises entraining the fuel in a stream of air, separating part of the air from said stream thereby enriching the remaining fuel and air mixture, delivering the enriched mixture to the upper portion of a furnace for combustion in an ignition zone and delivering the separated air to a lower portion of the furnace outside said ignition zone to rejoin the burning enriched mixture.

11. The method of supplying pulverized fuel to a furnace for combustion which comprises entraining the fuel in a stream of air, delivering the fuel and air mixture to a separating zone, separating part of the air from said stream thereby enriching the remaining mixture, delivering the enriched mixture to the upper portion of the furnace through one wall thereof for combustion in an ignition zone and delivering the separated air to the furnace through another wall thereof outside of said ignition zone and at a lower portion of the furnace to rejoin the burning enriched mixture.

12. The method of producing combustion of fuels which comprises entraining the fuel in a stream of air, causing said fuel and air stream to flow into a separating zone, separating part of the air from said stream thereby enriching the remaining fuel and air mixture, delivering the enriched mixture in a vertically downward direction to the upper portion of a furnace for combustion in an ignition zone, and delivering the separated air to a lower portion of the furnace outside said ignition zone to rejoin the burning enriched mixture.

13. Apparatus for producing combustion of fuel in a furnace comprising a separator, means for supplying the fuel entrained in a stream of air to the separator, means for withdrawing part of the air from said mixture to thereby enrich the remaining mixture, a burner nozzle disposed to deliver the enriched mixture to the upper portion of the furnace for combustion in an ignition section thereof, and conduit means having its discharge located to deliver the air withdrawn from said mixture to the furnace outside said ignition section in a lower portion of the furnace to rejoin said burning enriched mixture.

14. Apparatus for producing combustion of fuel in a furnace comprising a separator, means for supplying the fuel entrained in a stream of air to the separator, means for withdrawing part of the air from said mixture to thereby enrich the remaining mixture, a burner nozzle disposed to deliver the enriched mixture to the furnace in the upper portion thereof for combustion in an ignition section of the furnace, a valve for controlling the nozzle thereby to control the degree to which the mixture is enriched, and conduit means having its discharge located to deliver the air withdrawn from said mixture to the furnace outside said ignition section and in a lower portion of the furnace to rejoin said burning enriched mixture.

15. Apparatus for producing combustion of fuel in a furnace comprising a plurality of separators, a single conduit for delivering fuel entrained in a stream of air to each of said separators, means for withdrawing part of the air from the fuel-air mixture in each separator to thereby enrich the remaining mixture, means connected to each separator and located to deliver the enriched mixture to the upper portion of the furnace for combustion in an ignition section thereof, valve means for controlling the delivery of fuel entrained in air to the separators, and conduit means for delivering the air withdrawn from said mixture in each separator to a lower portion of the furnace and outside said ignition section to rejoin said burning enriched mixture.

16. Apparatus for producing combustion of fuel in a furnace comprising a plurality of separators adjacently disposed and located in a wall bounding an upper portion of the furnace, a single conduit for delivering fuel entrained in a stream of air to each of said separators, means for withdrawing part of the air from the fuel-air mixture in each separator to thereby enrich the remaining mixture, a nozzle for each separator through which the enriched mixture is delivered to the upper portion of the furnace for combustion in an ignition section thereof, and conduit means having its discharge located to deliver the air withdrawn from said mixture in each separator to the furnace outside said ignition section at an elevation lower than and spaced from said nozzles to rejoin said burning enriched mixture.

17. Apparatus for producing combustion of fuel in a furnace comprising a plurality of separators adjacently disposed and located in a wall bounding an upper portion of the furnace, a single conduit for delivering fuel entrained in a stream of air to each of said separators, means for withdrawing part of the air from the fuel-air mixture in each separator to thereby enrich the remaining mixture, a nozzle for each separator disposed to deliver the enriched mixture to the furnace at the upper portion thereof for combustion in an ignition section, and conduit means for delivering the air withdrawn from said mixture in each separator to the furnace outside said ignition section through a side wall of the furnace at an elevation lower than and spaced from said nozzles to rejoin said burning enriched mixture.

18. The method of producing combustion of fuels which comprises entraining the fuel in a stream of air, flowing the fuel and air mixture through a path sufficiently curved to effect a concentration of a major portion of the fuel into a minor portion of the air to provide an enriched fuel and air mixture, withdrawing the enriched mixture and delivering it in a downwardly direction to one portion of the furnace through one wall thereof for combustion in an ignition zone, and delivering the remaining portion of the original fuel and air mixture to another part of the furnace through another wall thereof at a point remote from the point at which the enriched mixture is delivered to the furnace so that said remaining portion flows in the furnace free of said ignition zone but into contact with the burning enriched mixture.

19. Apparatus for producing combustion of fuel in a furnace comprising a separator having an inlet for a fuel and air mixture, a passage sufficiently curved to effect a concentration of a major portion of the fuel in said mixture into a minor portion of the air thereof to provide an enriched fuel and air mixture, the separator having an outlet for the enriched mixture and another outlet for the remaining mixture, a burner nozzle connected to said outlet and disposed to deliver the enriched mixture in a downwardly direction to one portion of the furnace through one wall thereof for combustion in an ignition section thereof, and conduit means connected to said other outlet and having its discharge located in another wall thereof and directed to deliver the remaining mixture to the furnace at a point remote from said burner nozzle and so that the remaining mixture flows in the furnace free of said ignition zone but into contact with the burning enriched mixture.

MARTIN FRISCH.